United States Patent [19]

Abu-Isa

[11] 3,926,932

[45] Dec. 16, 1975

[54] PLATABLE POLYPROPYLENE

[75] Inventor: Ismat A. Abu-Isa, Birmingham, Mich.

[73] Assignee: General Motors Corporation, Detroit, Mich.

[22] Filed: Jan. 28, 1974

[21] Appl. No.: 436,881

Related U.S. Application Data

[60] Continuation of Ser. No. 238,464, Nov. 27, 1972, abandoned, which is a division of Ser. No. 66,127, Aug. 21, 1970, Pat. No. 3,695,917.

[52] U.S. Cl.......................... 260/93.7; 260/94.9 GD
[51] Int. Cl............................................ C08f 29/02

[58] Field of Search................... 260/93.7, 94.9 GD

[56] References Cited
UNITED STATES PATENTS

| | | | |
|---|---|---|---|
| 3,220,966 | 11/1965 | Flanagan...................... | 260/94.9 GD |
| 3,499,881 | 3/1970 | Poppe et al..................  | 260/94.9 GD |

Primary Examiner—Joseph L. Schofer
Assistant Examiner—A. Holler
Attorney, Agent, or Firm—Lawrence B. Plant

[57] ABSTRACT

Plating grade polypropylene mixture including about 5% to about 7% methyl abietate into the polymer.

1 Claim, No Drawings

PLATABLE POLYPROPYLENE

This application is a continuation of application Ser. No. 238,464, filed Nov. 27, 1972, now abandoned, which in turn is a divisional of application Ser. No. 66,127, filed Aug. 21, 1970, now U.S. Pat. No. 3,695,917.

This invention relates to the metal plating of polypropylene compositions. In the beginning, injection molded polypropylene articles were difficult to metal plate uniformly. Commercially available grades of polypropylene would not etch uniformly without a pre-etch treatment which involved soaking the polymer in an organic swelling agent, such as turpentine or the like. More recently, polypropylene compositions have been developed and marketed which do not require organic pre-etch treatments. These later compositions contain additives which promote uniform etching/oxidizing of the polypropylene composition. This, in turn, enhances the ability of the polypropylene to accept a uniform electroless deposit of metal. While certain of these addition agents do improve the platability of polypropylene, their presence apparently causes the polypropylene to suffer a loss with respect to some of its other properties, notably impact strength and heat deflection resistance.

Accordingly it is an object of this invention to provide a plating improver which is mixed with and absorbed by the propylene to produce a readily platable composition which has improved processing characteristics, impact strength, heat deflection resistance and adhesion values. This and other objects of this invention will become more apparent from the detailed description which follows.

In accordance with this invention methyl abietate is absorbed into at least the surface, but preferably all, of the part to be plated such that the concentration of the methyl abietate is at least about 2% by weight, of the mixture of methyl abietate and polypropylene at the surface to be plated. Methyl abietate concentrations of about 5 to 7% throughout the polypropylene are preferred. In these latter concentrations the physical properties of the polypropylene are significantly improved and the etching time minimized. No appreciable benefits are derived from methyl abietate concentrations in excess of about 15%, by weight. The higher methyl abietate concentrations consume excessive amounts of oxidant (i.e., $CrO_3$) during the surface oxidation etching step and returns no significant benefit over the use of the preferred 5 – 7%.

As used herein, the term "polypropylene" is intended to include both the polypropylene homopolymers and the principal copolymers thereof, such as the ethylene-propylene copolymers. Likewise, as used herein, the term "methyl abietate" is intended to include the methyl esters of the resin acids found in rosin. A mixture of such acids is commercially available under the name Abalyn. In this latter regard, *The Condensed Chemical Dictionary*, 6th Ed., Arthur and Rose, advises that the term "abietic acid" relates to the major active ingredient of rosin and is often applied to mixtures of acids which have closely related structure and properties to abietic acid, i.e., the resin acids.

The methyl abietate may be added to commercial grades of polypropylene (e.g., Hercules 6523) in at least two ways. In the preferred form, the methyl abietate is mixed uniformly with all of the polypropylene before it is injection molded into a given article. In this regard, a measured amount of methyl abietate, which is a viscous liquid, is added to a measured amount of polypropylene flakes and mixed in a Hinchel blender until the flakes completely absorb the methyl abietate and again become free-flowing. Injection molded articles made from polypropylene compositions thusly prepared, in addition to being more uniformly platable, have demonstrated higher impact strengths, better heat deflection characteristics and are less stressed in the as-molded condition than comparable articles prepared without the methyl abietate addition. Additionally, the methyl abietate treated polypropylene is more easily processed, especially during mixing operations such as during the blending of fillers with the polypropylene.

In another embodiment, the methyl abietate is absorbed into the surface of an article which has first been formed (e.g., injection molded) from a conventional non-plating grade polypropylene (e.g., Hercules 6523). This is accomplished by soaking the article in a suspension of methyl abietate (e.g., about 10%) in water, plus a non-ionic detergent (e.g., FC-95 anionic fluoro-chemical by Minnesota Mining & Manufacturing) to wet the polypropylene. Soaking continues until the surface absorbs a sufficient amount of the methyl abietate to provide at least the aforesaid minimum 2% concentration of the methyl abietate at the surface.

When the concentration of methyl abietate falls below about 2%, it is not practically possible to consistently uniformly etch or oxidize the surface within a reasonable amount of time, i.e., less than about 20 minutes. Uniform oxidation of the surface is required to obtain a uniformly deposited, strongly adherent electroless metal coating. On the other hand, when the concentration of methyl abietate exceeds about 15%, the polypropylene begins to feel oily to the touch resulting from the apparent saturation of the polypropylene with the methyl abietate. In this oily condition the methyl abietate provides no significant benefits over the lower and preferred concentrations and in fact is detrimental to the extent that it non-usefully consumes an excess amount of oxidant from the etching/oxidizing solution.

In a preferred embodiment of this invention, the methyl abietate is mixed completely throughout the polypropylene mixture and tends to plasticize it. It is this embodiment which yields the most significant improvements in the physical properties (i.e., impact strength, heat deflection, etc.) of the finished molded part itself, as distinguished from simply its platability. In this regard and in order to still further improve the properties and reduce the costs of the molded parts made from polypropylene mixtures of this invention, any of the conventional fillers (e.g., talc, titanium dioxide, etc.) typically used with thermoplastics may be used. When used, the fillers may comprise as little as 2% to as much as 50% of the finished injected molded article, though it is preferred here to use about 3 – 8% filler content.

Polypropylene mixtures prepared in accordance with this invention are platable using any of the conventional polymer plating processes known to those skilled in the art. Such conventional processes usually involve etching the surface with a strong oxidizing agent, sensitizing it with an aqueous $SnCl_2$ solution, activating it with a $PdCl_2$ solution and then electrolessly depositing a metal (e.g., Ni) onto the surface followed by any desired electroplating sequence. Likewise, polypropylenes prepared in accordance with this invention can be satisfactorily plated utilizing the commercially available MaCuplex system marketed by MacDermid, Inc. That process is a variation of that described above and involves the use of a mixture of stannous chloride and colloidal palladium instead of the more conventional sensitizing solution. This step is followed by a palladium chloride accelerator treatment. Likewise, the polypropylenes of this invention may be used in systems employing organic swelling pre-etch treatments, though as indicated before, such treatments are not necessary with methyl abietate treated polypropylenes.

In the etching, or surface oxidizing step, it is preferred to use the strongest oxidizing solutions possible. Aqueous solutions containing at least about 800 grams per liter of $CrO_3$ are most preferred, but the more conventional $H_2SO_4 - CrO_3$ etching systems may also be used. Such solutions insure uniform oxidation of the surface in the shortest possible time.

A number of tests have been conducted and their description will serve as specific examples of this invention. In these tests, a number of pieces were injection molded from mixtures containing polypropylene flakes (Hercules 6523), methyl abietate (Abalyn) and filler (talc). The methyl abietate and polypropylene were first mixed for about 10 minutes in a Hinchel blender at about 500 rpm until the methyl abietate was uniformly absorbed into the polypropylene flakes. This mixture was then placed in a screw fed injection molding machine with a measured amount of talc, thoroughly mixed and melted. The melt was injected into a mold at about 230°F. and 800 psi pressure. After cooling, the pieces were removed and aged for about 24 hours. Several of these pieces were then impact strength tested using the Notched Izod test described in ASTM D 256, heat deflection tested during the test described in ASTM D 648, and hardness tested using the test described in ASTM D 785. The remaining pieces were processed as follows. The pieces were immersed in a 75°C. chromic acid etching solution containing 900 grams per liter of $CrO_3$. After rinsing, the pieces were treated for 3 minutes in a room temperature, acidic, aqueous stannous chloride solution containing about 35 grams per liter of $SnCl_2$, and 30 milliliters per liter of HCl to sensitize its surface. After rinsing, the pieces were next activated for 3 minutes, in a 75°F. aqueous, palladium chloride solution containing 0.26 gram per liter palladium chloride and 4.5 milliliters per liter HCl. After rinsing, nickel was electrolessly deposited onto the surface for 7 minutes from an aqueous, 75°C. solution containing about 36 grams per liter nickel sulfate heptahydrate, 3.6 grams per liter sodium hydroxide, 28 grams per liter sodium hypophosphite, 13 cc per liter acetic acid and 10 drops of lead concentrate (1 g/l $Pb^{++}$). The pieces were rinsed and next electroplated with 2 mils of conventional acid copper (sulfate type) and then aged for at least 72 hours. Several of the pieces were then adhesion tested according to the Jacquet test described in the article by E. B. Saubestre, J. Durney, G. Hajdow, E. Bastenbach, Plating, 52, 983, 1965. This test involves scribing a one (1) inch strip across and through the copper and nickel layers, lifting a tab at the end of the strip, grasping the tab in an Instron machine, pulling the strip at a rate of one (1) inch per minute at an angle of 90° from the face of the panel, and recording the amount of pull (i.e., lbs./in.) required to peel the strip from the panel. The remaining pieces were processed in the following manner. A 0.7 mil layer of semi-bright nickel (Udylite N2E) covered the acid copper. This was followed by a 0.4 mil layer of bright nickel (Udylite 66) and finally by a 0.01 mil layer of chromium. The thusly plated pieces were aged for at least 72 hours and then subjected to thermal cycling in accordance with the following sequence which was repeated for four cycles - one hour at 185°F., 15 minutes at 72°F., one hour at −20°F., and 15 minutes at 72°F.

The following tables reflect typical results of pieces tested in accordance with the procedure described above. In Table I all samples except number 6, were compounded using polypropylene flakes identified as Hercules 6523. Sample 6 is the 4/1/69 data reported by Avison Co. for their plating grade polypropylene (TD 270A).

While this invention has been described in terms of specific embodiments thereof it is not intended that it be limited thereto, except to the extent hereinafter set forth in the appended claim which follows.

Table I

| Sample | Methyl Abietate | Percent (%) Filler | Impact Str. ASTM D 256 (ft.-lbs.) | Heat Deflection ASTM D 648 (66 psi) | Rockwell Hardness ASTM D 785 | Adhesion Jacquet Test (Lbs./in.) |
| --- | --- | --- | --- | --- | --- | --- |
| 1 | 0 | 0 | 0.65 | 102°C. | 830 | — |
| 2 | 6% | 0 | 1.27 | — | 540 | 20 |
| 3 | 3% | 3% $TiO_2$ | 1.15 | — | — | — |
| 4 | 6% | 5% talc | 1.07 | 105°C. | — | 35–50 |
| 5 | 5% | 3% talc | 1.24 | — | — | — |
| 6 | — | — | 0.38 | 94 | 800 | 18–24 |

Table II

| Sample | Methyl Abietate | Percent (%) Filler | Etch Time (Min.) | Post-Etch Appearance | Adhesion Jacquet Test (lbs./in.) | Thermal Cycling |
| --- | --- | --- | --- | --- | --- | --- |
| 1 | 2% | 0 | 20 (90°C.) | good | Passed tape test | — |
| 2 | 5% | 0 | 5 (90°C.) | good | 15–20 | Passed |
| 3 | 6% | 0 | 7 (85°C.) | good | 18–20 | Passed |
| 4 | 6% | 5% talc | 5 (80°C.) | good | 35–50 | Passed |
| 5 | 15% | 0 | 5 (80°C.) | oily | Passed tape test | — |

I claim:

1. Plating grade polypropylene flakes for forming into rigid articles destined to be metal plated, said flakes comprising principally high molecular weight polypropylene and methyl abietate in which the methyl abietate comprises about 5 to about 7% by weight of the combined polypropylene and methyl abietate, said high molecular weight polypropylene having a heat deflection of at least about 94°C. under a 66 psi load test according to ASTM standard (ASTM D648).

* * * * *

UNITED STATES PATENT AND TRADEMARK OFFICE
CERTIFICATE OF CORRECTION

PATENT NO. : 3,926,932
DATED : December 16, 1975
INVENTOR(S) : Ismat A. Abu-Isa

It is certified that error appears in the above-identified patent and that said Letters Patent are hereby corrected as shown below:

Column 1, line 29, the word "propylene" should read -- polypropylene --.
Column 3, line 34, the word "during" should read -- using --.

Signed and Sealed this eighteenth Day of May 1976

[SEAL]

Attest:

RUTH C. MASON
Attesting Officer

C. MARSHALL DANN
Commissioner of Patents and Trademarks